US009363240B2

(12) United States Patent
Zhang

(10) Patent No.: US 9,363,240 B2
(45) Date of Patent: Jun. 7, 2016

(54) METHOD AND SYSTEM FOR REDUCING NETWORK LATENCY

(75) Inventor: Jiangang Zhang, San Jose, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 330 days.

(21) Appl. No.: 13/598,869

(22) Filed: Aug. 30, 2012

(65) Prior Publication Data
US 2014/0067996 A1 Mar. 6, 2014

(51) Int. Cl.
*G06F 15/16* (2006.01)
*H04L 29/06* (2006.01)

(52) U.S. Cl.
CPC ................ *H04L 63/0428* (2013.01)

(58) Field of Classification Search
USPC ................................. 709/227–228
See application file for complete search history.

(56) References Cited

U.S. PATENT DOCUMENTS

| | | | |
|---|---|---|---|
| 8,381,282 B1* | 2/2013 | Doukhvalov et al. ........... 726/12 |
| 2002/0091834 A1* | 7/2002 | Isozu et al. .................... 709/227 |
| 2008/0130900 A1* | 6/2008 | Hsieh ............................ 380/278 |
| 2008/0172488 A1* | 7/2008 | Jawahar et al. ............... 709/225 |
| 2009/0177787 A1* | 7/2009 | Ishikawa et al. ............. 709/228 |
| 2009/0293000 A1* | 11/2009 | Lepeska ........................ 715/744 |
| 2010/0186076 A1* | 7/2010 | Ali et al. ........................... 726/9 |
| 2010/0250951 A1* | 9/2010 | Ueno et al. .................... 713/176 |
| 2010/0268840 A1* | 10/2010 | Hiie .............................. 709/231 |
| 2011/0283110 A1* | 11/2011 | Dapkus et al. ............... 713/182 |
| 2012/0174196 A1* | 7/2012 | Bhogavilli et al. ............... 726/5 |
| 2012/0254389 A1* | 10/2012 | Amemiya et al. ............. 709/223 |
| 2012/0265828 A1* | 10/2012 | Slepinin et al. ............... 709/206 |
| 2014/0082478 A1* | 3/2014 | Sebastian ...................... 715/234 |

OTHER PUBLICATIONS

Langley, A. et al.; "Transport Layer Security (TLS) False Start"; Jun. 2, 2012; http://toolsieft.org/html/draft-bmoeller-tls-falsestart-00; pp. 1-11.
"ImperialViolet"; Apr. 2012; http://www.imperialvioletorg/2012/04/11/falsestart.html; pp. 1-2.
Langley, A. et al.; Transport Layer Security (TLS) Snap Start; Jun. 18, 2010; http://tools.ietf.org/html/drft-agl-tls-snapstart; pp. 1-22.
Lawson, N.; "Root Labs Rdist"; SSL Optimization and Security Talk; Feb. 27, 2012; http://rdist.root.org/2012/02127/ssl-optimization-and-security-talk; pp. 1-9.
Santesson, S.; "Transport Layer Security (TLS) Cached Information Extension"; Dec. 26, 2011; http://tools.ietf.org/html/draft-ietf-tls-cached-info-11; pp. 1-14.

* cited by examiner

*Primary Examiner* — Abdullah E Salad
(74) *Attorney, Agent, or Firm* — Pillsbury Winthrop Shaw Pittman LLP

(57) ABSTRACT

Method, system, and programs for reducing network latency in a network. A first connection is established between a relay and a host in the network. The relay receives non-confidential information from the host over the first connection. A second connection is then established between the relay and a node in the network. The relay then communicates with the node, over the second connection, non-confidential information on behalf of the host based on the received non-confidential information from the host. The relay also forwards, over the first and second connections, confidential information between the node and the host.

21 Claims, 11 Drawing Sheets

Exemplary Software Configuration at Relay:

```
<target_host id = "server-a" addr = "10.1.0.1:443" concurrency ="100">
    <url_match pattern = "*mail.yahoo.com*" />
    <url_match pattern = "*mail.yahoo.net*" />
</target_host>
<target_host id = "server-b" addr = "10.1.0.2:443" concurrency ="100">
    <url_match pattern = "*msngr.yahoo.com*" />
    <url_match pattern = "*msngr.yahoo.net*" />
</target_host>
<proxy-mapping addr = "10.0.0.1:443" target_host_id = "server-a"
    concurrency = "100"/>
<proxy-mapping addr = "10.0.0.2:443" target_host_id = "server-b"
    concurrency = "100"/>
```

Fig. 10

METHOD AND SYSTEM FOR REDUCING NETWORK LATENCY

BACKGROUND

1. Technical Field

The present disclosure relates to methods, systems, and programming for reducing network latency.

2. Discussion of Technical Background

Network latency is the time it takes for a data packet to transmit from point A to point B in a network. It can be measured with either one-way or round-trip time (RTT). If A and B are connected via LAN (Local Area Network), normally the RTT may range from less than 1 ms to 5 ms. On the other hand, if A and B are connected via long haul (e.g. cross-the-ocean or trans-continent) WAN (Wide Area Network), the RTT may range from 100 ms to 200 ms or even more.

HTTP (Hypertext Transfer Protocol) serving is based on TCP (Transmission Control Protocol), which requires a 3-way handshake (1 RTT) for connection setup before real application data can be transmitted from a server to a client, or the other way around If the client and the server are connected via long haul WAN, a high latency may severely impact user experience. To eliminate this 1 RTT over WAN, some content providers deploy static HTTP contents in partner locations that are close to the users. These locations may be called PODs or relays. For dynamic HTTP content, a special HTTP proxy is deployed in the relays to maintain persistent TCP connection to origin server via WAN and perform URL (uniform resource locator) based routing.

HTTPS (Hypertext Transfer Protocol Secure) serving is based on SSL (Secure Sockets Layer) or TLS (Transport Layer Security) protocol, which requires a 4-way full handshake or a 3-way abbreviated handshake. The corresponding network latency is 3 RTT for full handshake or 2 RTT for abbreviated handshake, before real application data can be transmitted. SSL is the predecessor of TLS and it is similar to TLS in the context of this disclosure, we use TLS and SSL interchangeably hereafter. The latency may be multiplied when loading a complex secure web page, where many SSL connection setups are required. Besides, the server certificate message in SSL full handshake may be as large as 4K bytes, about 3 packets by itself. Fragmentation and possible packet loss and retransmission over WAN may add more network latency. This is also true and applicable to other protocols and applications directly or indirectly based on TCP+SSL.

There are some research and industry efforts for improving SSL network latency. Google False Start is a method of reducing the TCP+SSL full handshake to 2 round trips. However, Google False Start suffers security concerns and lack of compatibility from both the server and client side. Support of Google False Start has been dropped since Chrome version 20. Google Snap Start is another method of reducing the TCP+SSL full handshake to 1 round trip for ciphers not requiring Server Key Exchange message, e.g., PFS ciphers. However, Google Snap Start is a rewrite of the SSL protocol and suffers security concerns and lack of compatibility from both the server and client side. Support of Google Snap Start has been dropped. TLS cached into extension, an IETF (Internet Engineering Task Force) draft, is a method of helping network latency by caching certificate chain of known server at the client side. However, it does not reduce network round trips in a full TCP+SSL handshake. And it does not help abbreviated SSL handshake at all.

Therefore, there is a need to provide a solution for reducing the network latency without compromising connection security.

SUMMARY

The present disclosure relates to methods, systems, and programming for reducing network latency.

In one example, a method, implemented on at least one machine having at least one processor, storage, and a communication platform connected to a network for reducing network latency is provided. A first connection is established between a relay and a host in the network. The relay receives non-confidential information from the host over the first connection. A second connection is then established between the relay and a node in the network. The relay then communicates with the node, over the second connection, non-confidential information on behalf of the host based on the received non-confidential information from the host. The relay also forwards, over the first and second connections, confidential information between the node and the host.

In another example, a method, implemented on at least one machine having at least one processor, storage, and a communication platform connected to a network for reducing network latency is provided. A first connection is established between a relay and a host in the network. The host transmits non-confidential information to the relay. And the relay communicates with a node in the network, over a second connection established between the relay and the node, non-confidential information on behalf of the host based on the non-confidential information from the host. The host also communicates via the relay, confidential information with the node. And the relay forwards, over the first and second connections, confidential information between the node and the host.

In a different example, a system for reducing network latency in a network is presented, which includes a connection establishing unit, a listening unit, a communication unit, and a transmitting unit in a relay in the network. The connection establishing unit is configured to establish a first connection between the relay and a host in the network, and establish a second connection between the relay and a node in the network. The listening unit is configured to receive, over the first connection, non-confidential information from the host. The communication unit is configured to communicate with the node, over the second connection, non-confidential information on behalf of the host based on the received non-confidential information from the host. The transmitting unit is configured to forward, over the first and second connections, confidential information between the node and the host.

In another different example, a system for reducing network latency in a network is presented, which includes a connection establishing unit, a transmitting unit, and a communication unit in a host in the network. The connection establishing unit is configured to establish a first connection between the host and a relay in the network. The transmitting unit is configured to transmit, over the first connection, non-confidential information to the relay. The relay communicates with a node in the network, over a second connection established between the relay and the node, non-confidential information on behalf of the host based on the non-confidential information from the host. The communication unit is configured to communicate via the relay, confidential information with the node. The relay also forwards, over the first and second connections, confidential information between the node and the host.

Other concepts relate to software for automatically deploying a distributed application stack on a cluster. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for reducing network latency in a network, wherein the information, when read by the machine, causes the machine to perform a series of steps. A first connection is established between a relay and a host in the network. The relay receives non-confidential information from the host over the first connection. A second connection is then established between the relay and a node in the network. The relay then communicates with the node, over the second connection, non-confidential information on behalf of the host based on the received non-confidential information from the host. The relay also forwards, over the first and second connections, confidential information between the node and the host.

In another example, a machine readable and non-transitory medium having information recorded thereon for reducing network latency in a network, wherein the information, when read by the machine, causes the machine to perform a series of steps. A first connection is established between a relay and a host in the network. The host transmits non-confidential information to the relay. And the relay communicates with a node in the network, over a second connection established between the relay and the node, non-confidential information on behalf of the host based on the non-confidential information from the host. The host also communicates via the relay, confidential information with the node. And the relay forwards, over the first and second connections, confidential information between the node and the host.

Additional advantages and novel features will be set forth in part in the description which follows, and in part will become apparent to those skilled in the art upon examination of the following and the accompanying drawings or may be learned by production or operation of the examples. The advantages of the present disclosures may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 10 shows an exemplary software configuration, according to an embodiment of the present disclosure.

DETAILED DESCRIPTION

In the following detailed description, numerous specific details are set forth by way of examples in order to provide a thorough understanding of the relevant disclosures. However, it should be apparent to those skilled in the art that the present disclosures may be practiced without such details. In other instances, well known methods, procedures, systems, components, and/or circuitry have been described at a relatively high-level, without detail, in order to avoid unnecessarily obscuring aspects of the present disclosures.

The present disclosure describes method, system, and programming aspects of reducing network latency in a communication system. The method and system as disclosed herein aim at reducing network latency in the communication system without losing confidentiality and integrity. Such method and system benefit the communication between a node and a host in several ways: for example, the network latency is significantly reduced; there is no need for a change at the node; and there is no compromise of connection security.

Figure 1:
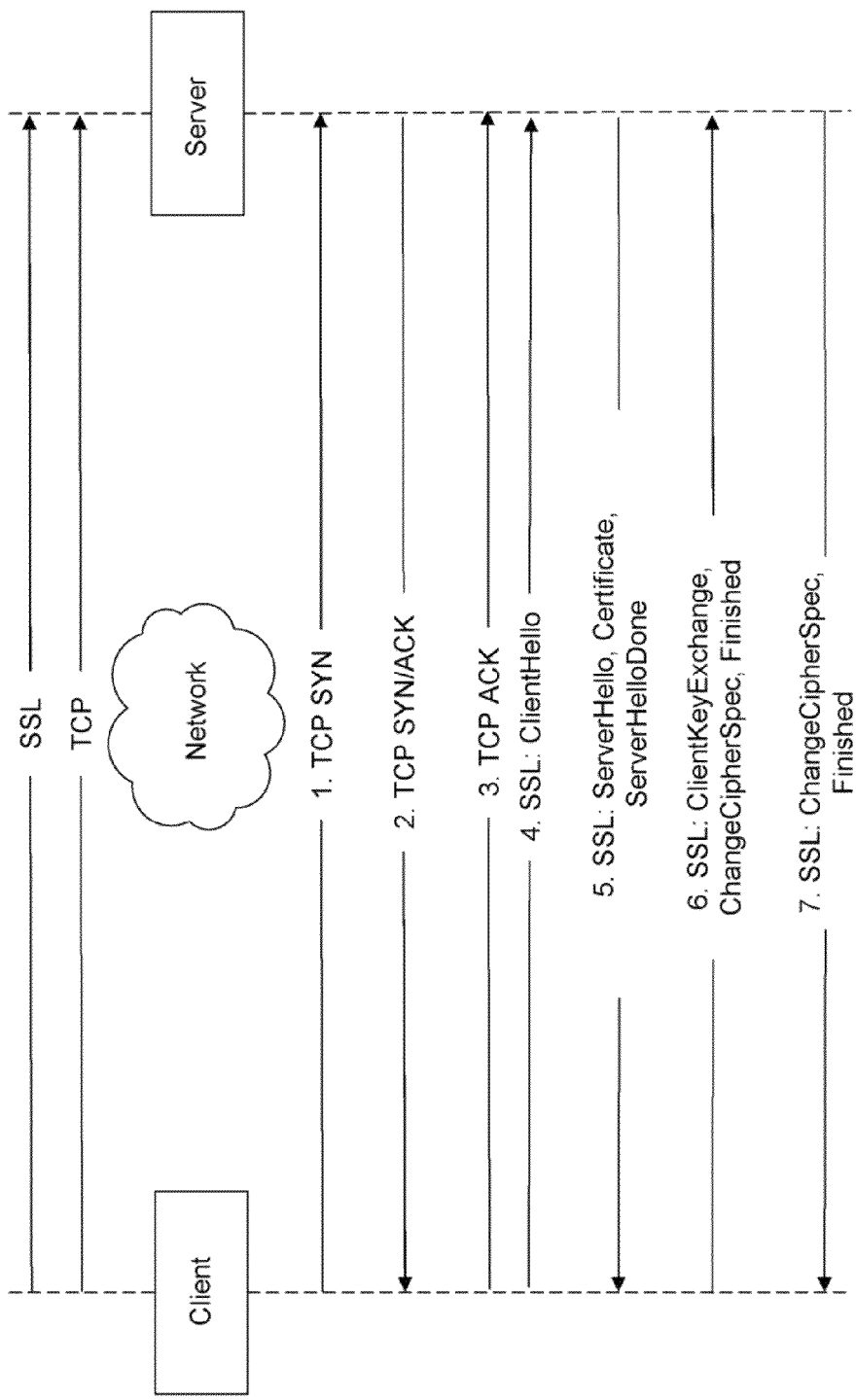
FIG. 1 is a time line chart illustrating an example of a TCP+SSL handshake protocol, according to an embodiment of prior art.

FIG. 1 is a time line chart illustrating an example of a TCP+SSL handshake protocol, in accordance with an embodiment of prior art. When an SSL client initiates an SSL session, it first establishes the TCP connection via TCP 3-way handshake. At step 1, the client sends a SYN packet to the server to initiate an active open. At step 2, the server replies to the client with a SYN/ACK packet. At step 3, the client sends an ACK packet back to the server. Then SSL full handshake starts. At step 4, the client sends a SSL ClientHello message to the server, immediately after step 3. At step 5, the server responds with a SSL Served-kilo message, a Certificate message, and a ServerHelloDone message. Then at step 6, the client responds with a SSL ClientKeyExchange message, a SSL ChangeCipherSpec message, and a SSL Finished message. Finally at step 7, the server sends a SSL ChangeCipherSpec message and a SSL Finished message to complete the handshake. As illustrated in FIG. 1, steps 1 and 2 are one round trip; steps 3, 4 and 5 are another round trip, and steps 6 and 7 are still another round trip. Hence, 3 round trips are needed.

To save round trips in HTTPS serving, or other secure servings based on TCP+SSL protocol, one solution is to cache the static content in the relays (PODs) and to proxy the dynamic contents via a proxy in the relays maintaining persistent secure connections to the origin servers over the WAN. This means terminating SSL at the relays and presenting private keys at the relays. The private keys correspond to the SSL server certificates and other cryptographic secrets are needed to establish secure tunnel back to content provider's data center. If these private keys or secrets are owned, the entire secure serving may be owned. Moreover, these relays may not be owned or controlled by the content providers, and may be located in jurisdictions that are potentially hostile to the content provider and/or users that it serves. And there may be no trusted personnel from (or authorized by) the content providers on site to do secure administration and provisioning either.

Figure 2:
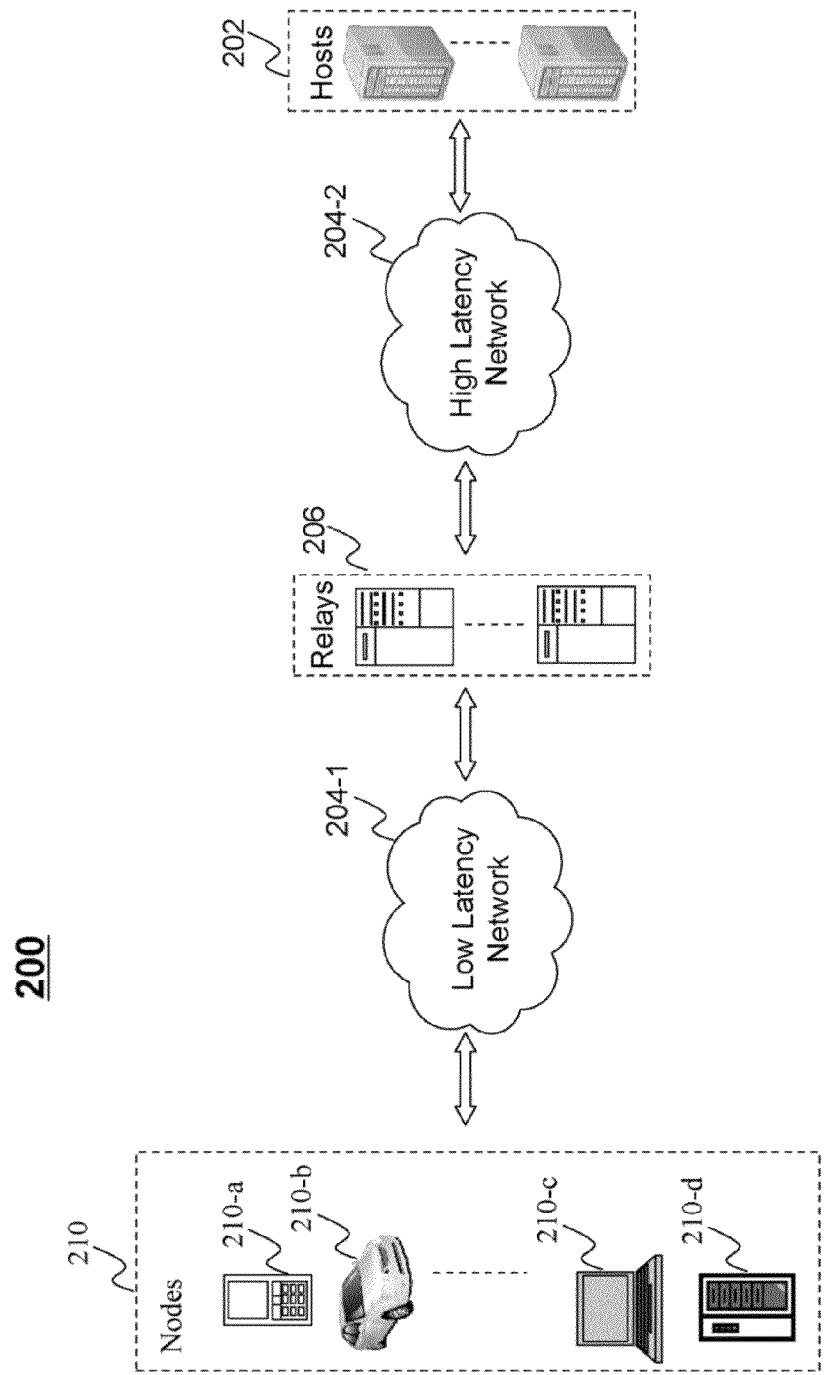
FIG. 2 is a high level exemplary system diagram of a system for reducing network latency, according to an embodiment of the present disclosure.

FIG. 2 depicts a high-level exemplary system diagram of a system for reducing network latency, according to an embodiment of the present disclosure. In FIG. 2, the exemplary system 200 includes a cluster of hosts 202, a cluster of relays 206, a cluster of nodes 210, and a network 204. The network 204 may be a local area network (LAN), a wide area network (WAN), a public network, a private network, a proprietary network, a Public Telephone Switched Network (PSTN), the Internet, a wireless network, a virtual network, or any combination thereof. The network 204 may be a single network or a combination of different networks. In this example, the network 204 includes a low latency network 204-1 between the nodes 210 and the relays 206 and a high latency network 204-2 between the relays 206 and the hosts 202.

Nodes 210 may be of different types such as nodes connected to the network 204-1 via desktop connections (210-*d*), nodes connecting to the network 204-1 via wireless connections such as through a laptop (210-*c*), a handheld device (210-*a*), or a built-in device, in a motor vehicle (210-*b*). The cluster of hosts 202 may be a set of machines owned by one entity, e.g., enterprise, and maintained as a server farm or server cluster where the servers are mounted on racks in a server room or data center. The cluster of hosts 202 may also be a collection of machines owned by different entities and that are physically separate from each other at a distance.

The relays 206 is located closer to the nodes 210 than to the hosts 202, in terms of physical distance or network latency. In this exemplary system 200, a node, e.g., 210-*a*, may send a message to a host 202 via a relay 206. Depending on whether this message is confidential or not, the relay 206 may forward it to the host 202, or reply to the node 210-*a* on behalf of the host 202. While the method and system as disclosed herein may apply to a plurality of nodes 210, relays 206, and hosts 202, the description in the disclosed examples will focus on one relay 206 helping communications between one node 210 and one host 202.

Figure 3:
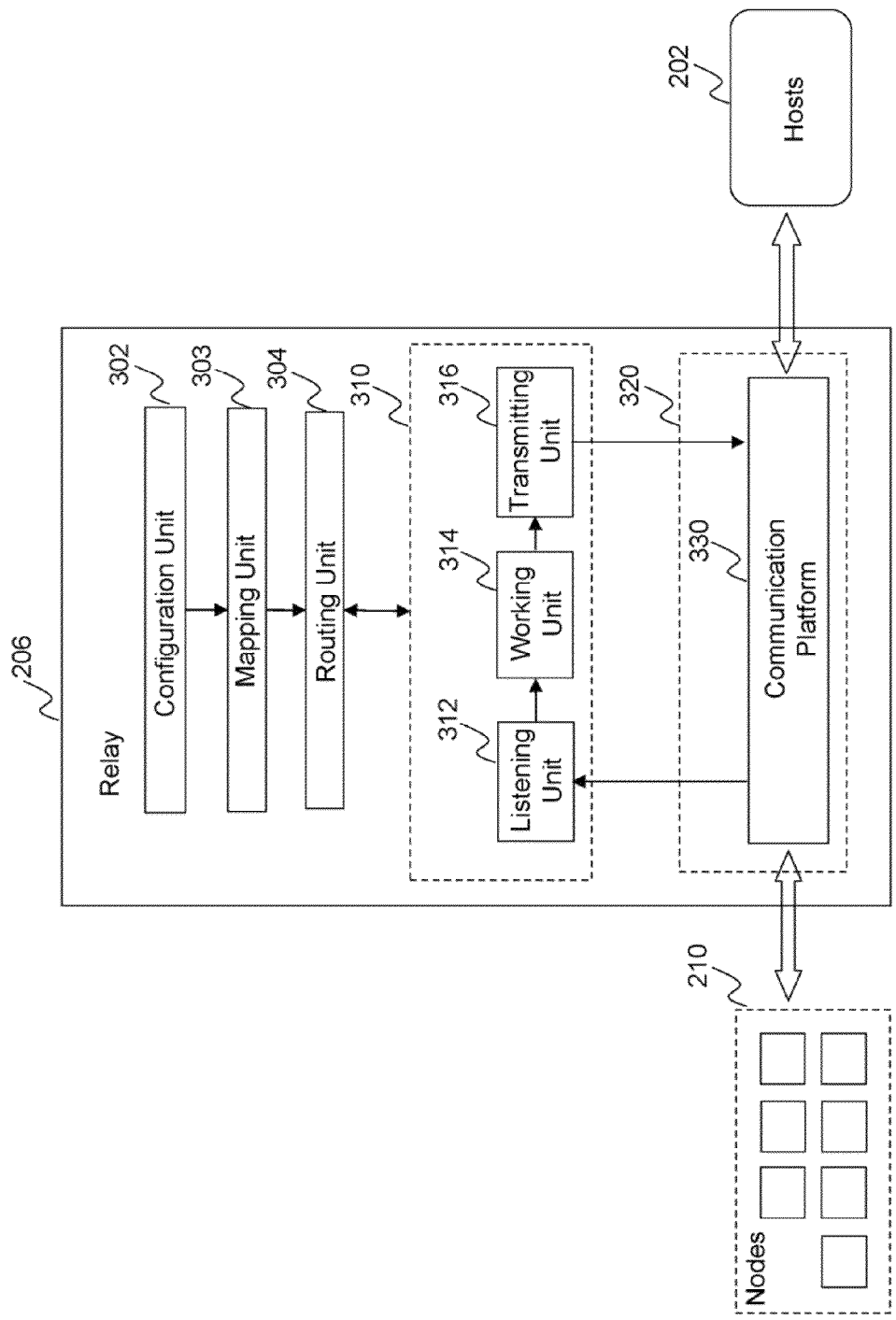
FIG. 3 is a block diagram illustrating an example of a relay shown in FIG. 2, according to an embodiment of the present disclosure.

FIG. 3 is a block diagram illustrating an example of a relay shown in FIG. 2, according to an embodiment of the present disclosure. In this example, the relay 206 includes a configuration unit 302, a mapping unit 303, a routing unit 304, a communication unit 310, and a connection establishing unit 320. The connection establishing unit 320 further includes a communication platform 330 and is configured to establish a first, connection between the relay 206 and a host 202 in the network 204 and establish a second connection between the relay 206 and a node 210 in the network 204, through the communication platform 330. The communication unit 310 further includes a listening unit 312, a working unit 314, and a transmitting unit 316. In this example, the listening unit 312 is configured to receive, over the first connection, non-confidential information from the host 202. The communication unit 310 is configured to communicate with the node 210, over the second connection, non-confidential information on behalf of the host 202 based on the received non-confidential information from the host 202. And the transmitting unit 316 is configured to forward, over the first and second connections, confidential information between the node 210 and the host 202 without decrypting them. In this example, the first connection may be based on Transmission Control Protocol (TCP), and the non-confidential information received over the first connection may include parameters from a list of cipher suite preference, a list of random numbers, or a list of session identifications (IDs).

In one example, the listening unit 312 is further configured to receive a first non-confidential message from the node 210. The working unit 314 is configured to select parameters for the first non-confidential message based on the non-confidential information received over the first connection, and generate a second non-confidential message based on the selected parameters. And the transmitting unit 316 is further configured to transmit the second non-confidential message to the node 210 on behalf of the host 202. In this example, the first and second non-confidential messages may comprise handshake messages based on SSL.

In another example, the listening unit 312 is further configured to receive a first confidential message from the node 210 and a second confidential message from the host 202. The working unit 314 is configured to select parameters for the first confidential message based on the non-confidential information received over the first connection. And the transmitting unit 316 is further configured to transmit the first confidential message and the selected parameters to the host 202, and transmit the second confidential message to the node 210. In this example, the first and second confidential messages may comprise handshake messages based on SSL.

In still another example, the configuration unit 302 configures the relay 206 to route network traffic to the host based on a configuration file. The routing unit 304 can also be configured to route to the host based on SSL Server Name Indication (SNI) extension or any other extension that can assist routing. And the mapping unit 303 is configured to provide a list, of mapping between an endpoint the relay 206 listens to and an endpoint that the host 202 listens to. FIG. 10 shows an exemplary software configuration for the mapping at the relay 206, according to an embodiment of the present disclosure. The relay 206 may be connected via the network 204-2 with higher latency to the host 202 and connected via the network 204-1 with lower latency to the node 210.

Figure 4:
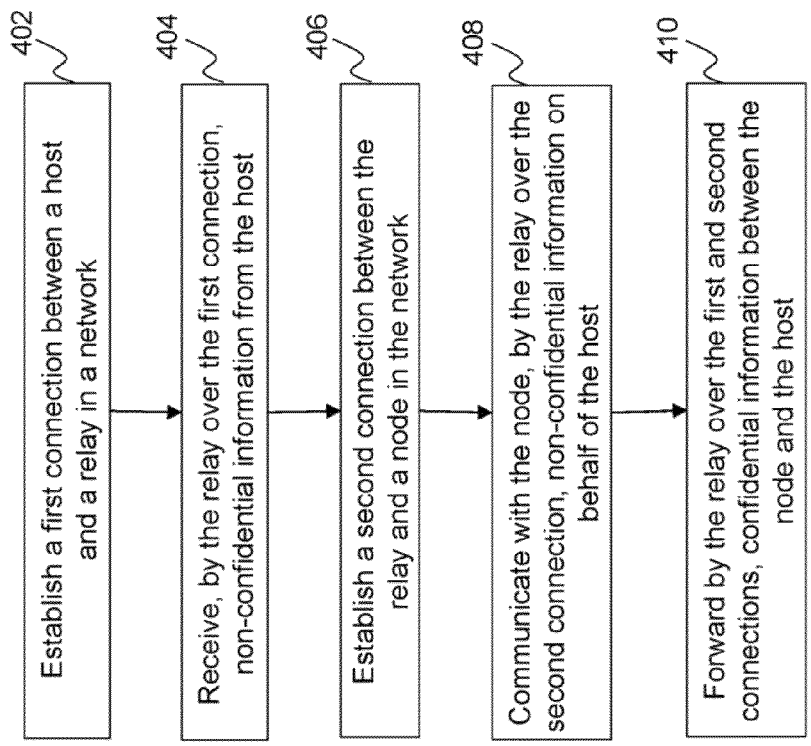
FIG. 4 is a flow chart illustrating an example of a method for reducing network latency, according to an embodiment of the present disclosure.

FIG. 4 is a flow chart illustrating an example of a method for reducing network latency, according to an embodiment of the present disclosure, it will be described with reference to the above figures. However, any suitable unit may be employed. Beginning at block 402, a first connection is established between the relay 206 and the host 202 in a network. Proceeding to block 404, non-confidential information is received from the host 202, by the relay 206 over the first connection. Then at block 406, a second connection is established between the relay 206 and the node 210 in the network. Moving to block 408, non-confidential information is communicated with the node 210, by the relay 206 over the second connection, on behalf of the host 202 based on the received non-confidential information from the host 202. Then at block 410, confidential information is forwarded between the node 210 and the host 202, by the relay 206 over the first and second connections. As described above, blocks 402-410 may be performed by the relay 206.

Figure 5:
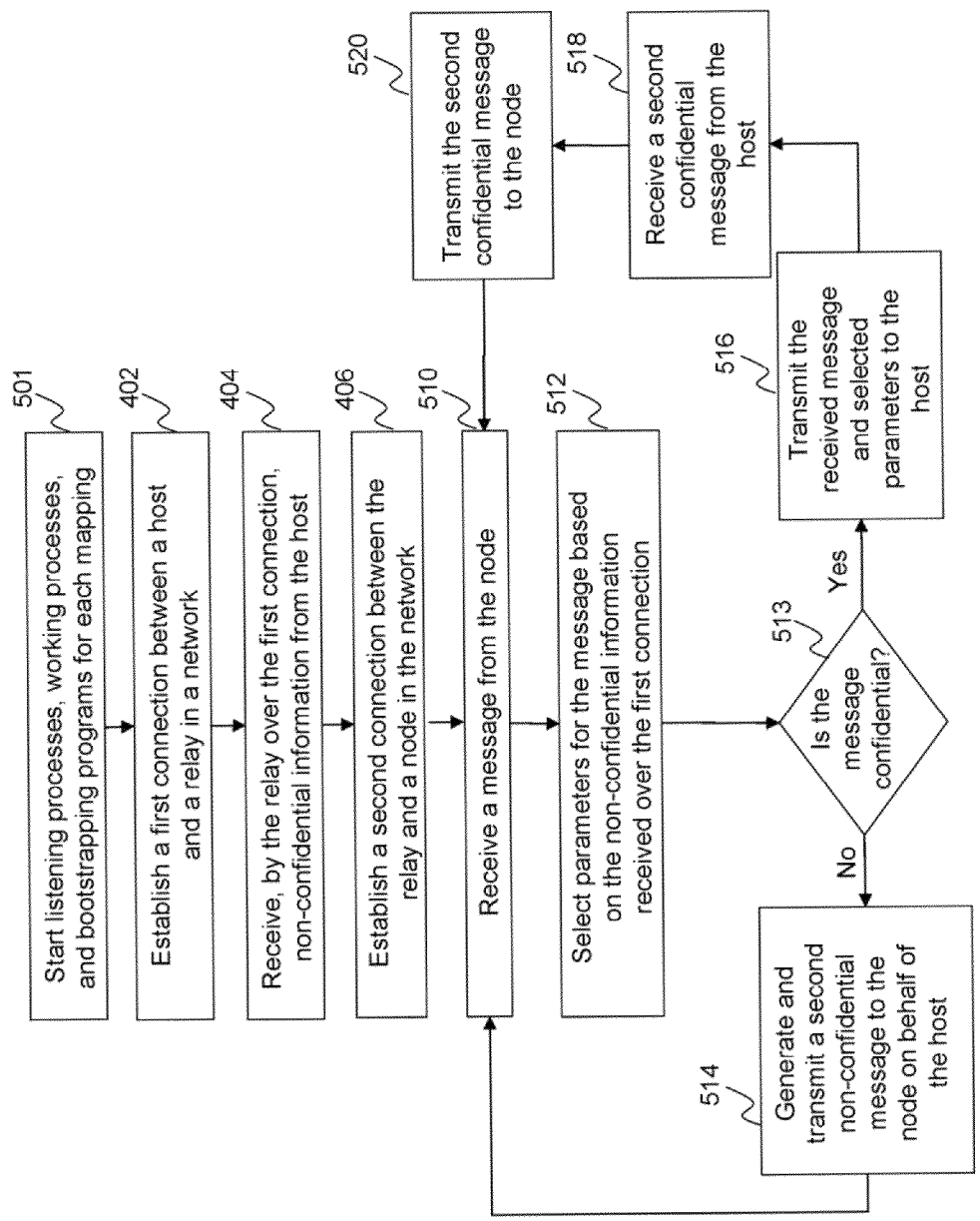
FIG. 5 is a flow chart illustrating another example of a method for reducing network latency, according to an embodiment of the present disclosure.

FIG. 5 is a flow chart illustrating another example of a method for reducing network latency, according to an embodiment of the present disclosure. It will be described with reference to the above figures. However, any suitable unit may be employed. Beginning at block 501, the relay 206 starts listening processes, working processes, and bootstrapping programs for each mapping configured by the mapping unit 303 of the relay 206. As described above, this may be performed by the configuration unit 302 in conjunction with the listening unit 312 and the working unit 314 of the relay 206. Moving to block 402, a first connection is established between the host 202 and the relay 206 in the network 204. As described above, this may be performed by the connection establishing unit 320 through the communication platform 330 of the relay 206. Then at block 404, non-confidential information is received from the host 202 by the relay 206 over the first connection. As described above, this may be performed by the listening unit 312 through the communication platform 330 of the relay 206. Proceeding to block 406, a second connection is established between the relay 206 and the node 210 in the network 204. As described above, this may again be performed by the connection establishing unit 320 through the communication platform 330 of the relay 206. At block 510, a message is received from the node 210. Then at block 512, the relay 206 selects parameters for the message based on the non-confidential information received over the first connection. As described above, blocks 510 and 512 may be performed by the listening unit 312 in conjunction with the working unit 314 and the communication platform 330 of the relay 206.

Moving to block 513, whether the message received in block 510 is confidential is determined. This may be performed by the working unit 314 of the relay 206. If the message is confidential, process continues to block 516, where the received message and selected parameters are transmitted to the host 202. As described above, this may be performed by the transmitting unit 316 through the communication platform 330 of the relay 206. At block 518, a second confidential message is received from the host 202. As described above, this may be performed by the listening unit 312 through the communication platform 330 of the relay 206. Then at block 520, the second confidential message is transmitted to the node 210. As described above, this may be performed by the transmitting unit 316 through the communication platform 330 of the relay 206. At this point, the process in this example may proceed to block 510 to start another cycle of communication.

On the other hand, if the message is not confidential, process continues to block 514, where a second non-confidential message is generated and transmitted to the node 210 on behalf of the host 202. As described above, this may be performed by the working unit 314 in conjunction with the transmitting unit 316 and the communication platform 330 of the relay 206. At this point, the process in this example may proceed to block 510 to start another cycle of communication.

Figure 6:
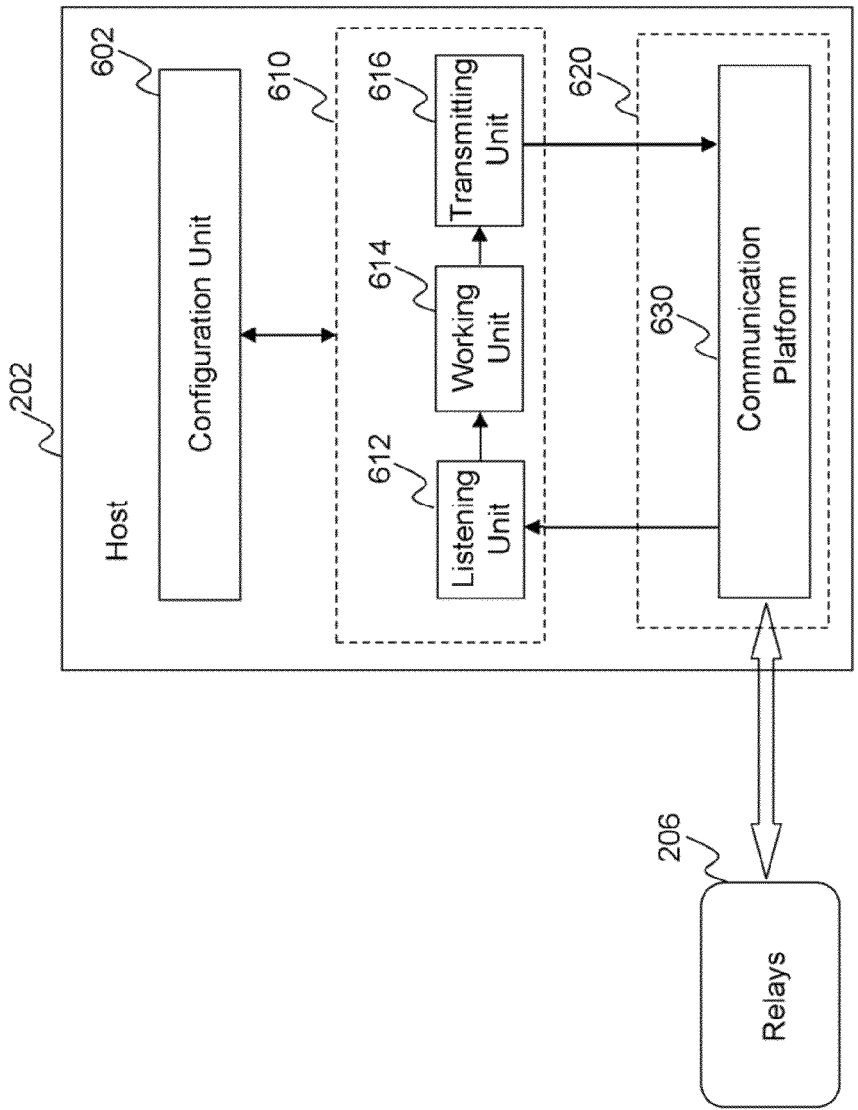
FIG. 6 is a block diagram illustrating an example of a host shown in FIG. 2, according to an embodiment of the present disclosure.

FIG. 6 is a block diagram illustrating an example of a host shown in FIG. 2, according to an embodiment of the present disclosure. In this example, the host 202 includes a configuration unit 602, a communication unit 610, and a connection establishing unit 620. The connection establishing unit 620 further includes a communication platform 630 and is configured to establish a first connection between the host 202 and the relay 206 in a network, through the communication platform 630. The communication unit 610 further includes a listening unit 612, a working unit 614, and a transmitting unit 616. In this example, the transmitting unit 616 is configured to transmit, over the first connection, non-confidential information to the relay 206. The relay 206 may establish a second connection between the relay 206 and the node 210 in the network. And the relay 206 may communicate with the node 210, over the second connection, non-confidential information on behalf of the host 202 based on the non-confidential information from the host 202. The communication unit 610 is configured to communicate, via the relay 206, confidential information with the node 210. The relay 206 may forward, over the first and second connections, confidential information between the node 210 and the host 202.

In one example, the configuration unit 602 is configured to provide a configuration file. The listening unit 612 is configured to receive messages from the relay 206. And the working unit 614 is configured to generate messages, which may be transmitted to the relay 206 by the transmitting unit 616 through the communication platform 630.

Figure 7:
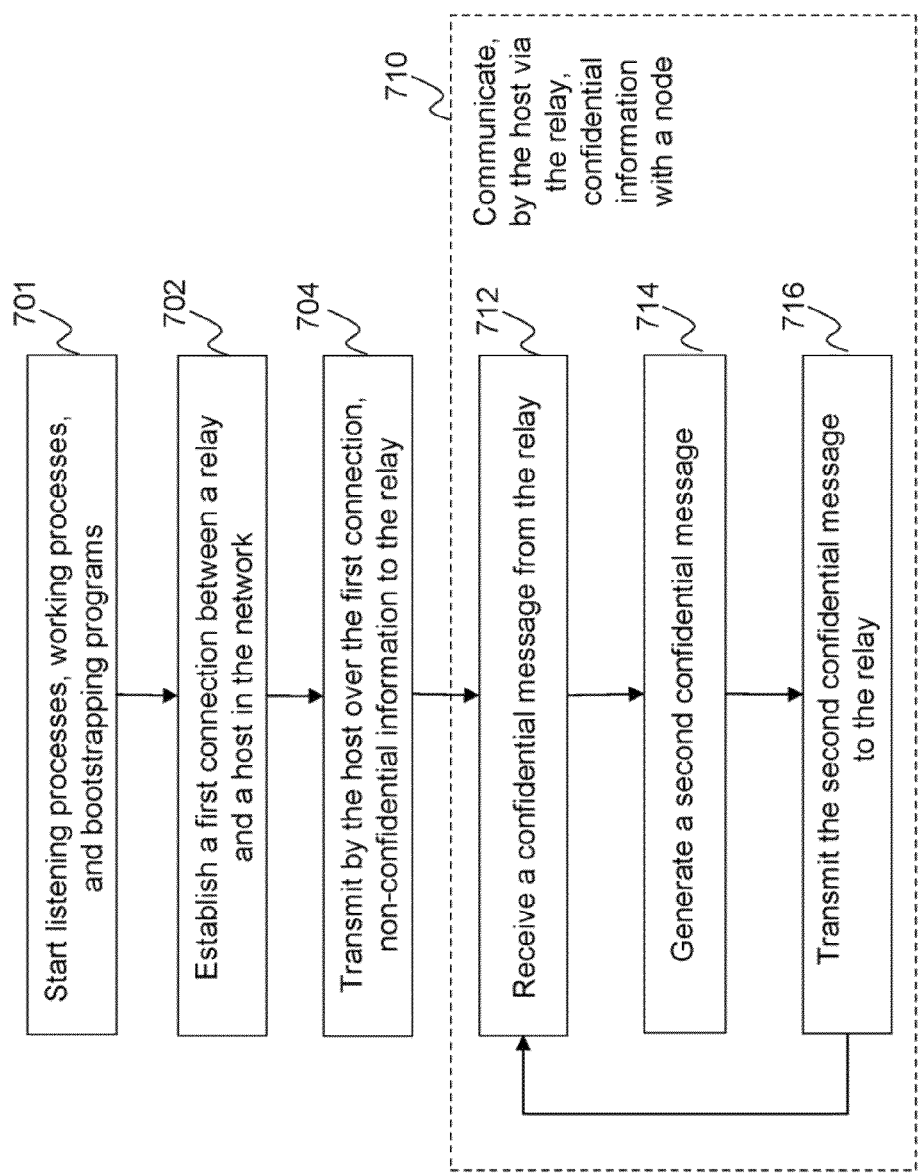
FIG. 7 is a flow chart illustrating still another example of a method for reducing network latency, according to an embodiment of the present disclosure.

FIG. 7 is a flow chart illustrating still another example of a method for reducing network latency, according to an embodiment of the present disclosure. It will be described with reference to the above figures. However, any suitable unit may be employed. Beginning at block 701, the host 202 starts listening processes, working processes, and bootstrapping programs. As described above, this may be performed by the configuration unit 602 in conjunction with the listening unit 612 and the working unit 614 of the host 202. Moving to block 702, a first connection is established between the host 202 and the relay 206 in the network 204. As described above, this may be performed by the connection establishing unit 620 through the communication platform 630 of the host 202. Then at block 704, non-confidential information is transmitted to the relay 206 by the host 202 over the first connection. As described above, this may be performed by the transmitting unit 612 through the communication platform 630 of the host 202.

Proceeding to block 710, confidential information is communicated with the node 210 by the host 202 via the relay 206. As described above, this may be performed by the communication unit 610 through the communication platform 630 of the host 202. To give a detailed example, block 710 comprises blocks 712, 714, and 716. At block 712, a confidential message is received from the relay 206. As described above, this may be performed by the listening unit 612 through the communication platform 630 of the host 202 Moving to block 714, a second confidential message is generated. As described above, this may be performed by the working unit 614 of the host 202. Then at block 716, the second confidential message is transmitted to the relay 206 As described above, this may be performed by the transmitting unit 616 through the communication platform 630 of the host 202. At this point, the process in this example may proceed to block 712 to start another cycle of communication.

In one example, before entering block 710, a second connection may be established between the relay 206 and the node 210 in the network 204. The relay 206 may communicate with the node 210, over the second connection, non-confidential information on behalf of the host 202 based on the non-confidential information received from the host 202. And the relay 206 may forward, over the first and second connections, confidential information between the node 210 and the host 202.

Figure 8:
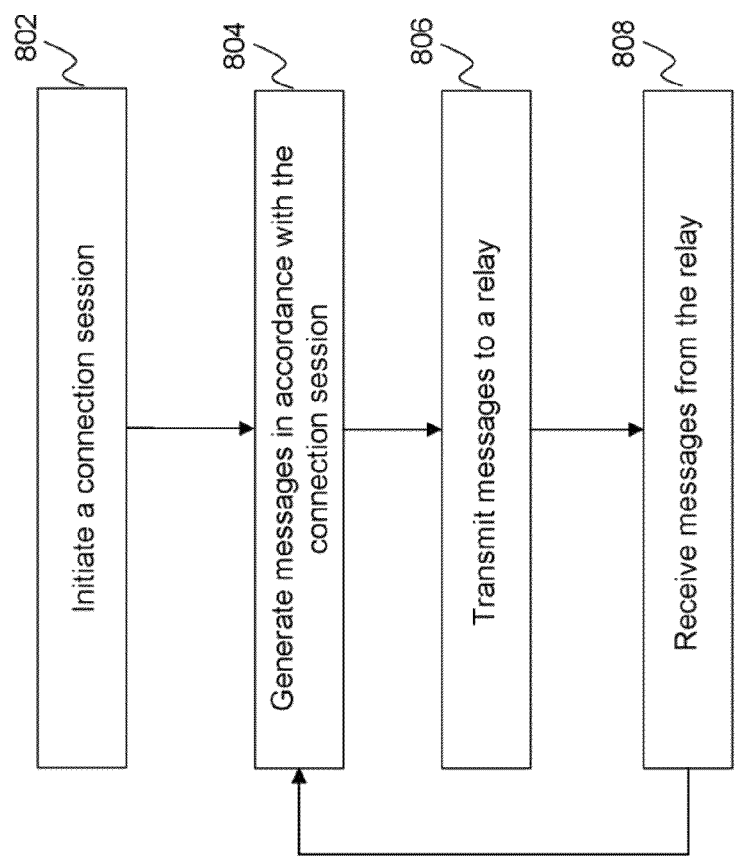
FIG. 8 is a flow chart illustrating yet another example of a method for reducing, network latency, according to an embodiment of the present disclosure.

FIG. 8 is a flow chart illustrating yet another example of a method for reducing network latency, according to an embodiment of the present disclosure. It will be described with reference to the above figures. However, any suitable unit may be employed. Beginning at block 802, a connection session is initiated at the node 210 in a network. Moving to block 804, messages are generated in accordance with the connection session. Then at block 806, the messages are transmitted to the relay 206. And at block 808, messages are received from the relay 206. At this point, the process in this example may proceed to block 804 to start another cycle of communication. Notice the node 210 does not need to know whether the messages received at the node 210 are generated by the host 202 or the relay 206.

Figure 9:
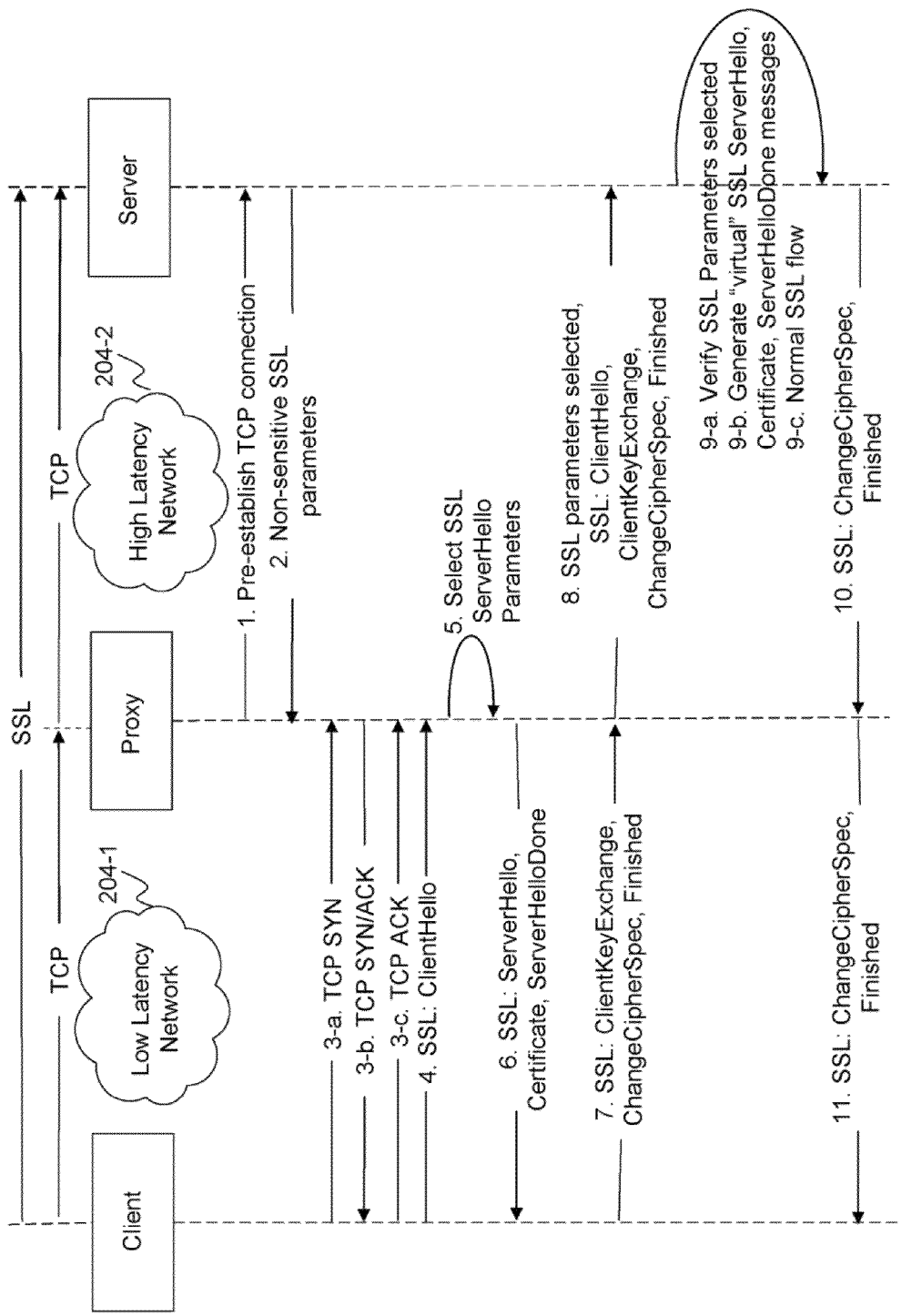
FIG. 9 is a time line chart illustrating an example of a handshake protocol, according to an embodiment of the present disclosure.

FIG. 9 is a time line chart illustrating an example of a TCP+SSL handshake protocol, according to an embodiment of the present disclosure. In this example, a transparent SSL proxy is sitting in a relay on a route from a node to a host, but closer to the node. Let x (with ms as a unit) be the one-way network latency between the node (e.g., SSL client) and the relay (where the SSL proxy sits), and y (with ms as a unit) be the one-way network latency between the relay and the host (e.g., origin server in content provider's data centers). Here, x is far less than y (x<<y) because the latter is usually via long-haul cross-ocean or cross-continent network with high latency 204-2, and the former is via a low latency network like LAN. At step 1, the SSL proxy pre-establishes a persistent TCP connection to the SSL server in the content provider's data center via long haul WAN network. And at step 2, the SSL server provides the proxy a list of non-sensitive SSL parameters that it will use for SSL sessions via that TCP connection. Steps 1 and 2 do not incur latency for a client SSL session because it is done before that.

The SSL parameters may include a list of cipher suite preference, possible compression support, a list of random numbers, or a list of session IDs. The server generates the list of random numbers for the TCP connection and will accept them within a given time window as server random in SSL protocol. The server also generates the list of session IDs and will accept them within the given time window as session ID (if resumption supported) in SSL protocol. None of these SSL parameters are confidential. In this example, the server provides the random numbers so that the SSL proxy can select one front the list provided by the server, which ensures quality of randomness and uniqueness for the chosen random number.

When the SSL client (e.g., a browser in case of HTTPS) initiates an SSL session, it first establishes a TCP connection via TCP 3-way handshake, since HTTPS is normally HTTP over SSL over TCP, not HTTP over SSL over UDP (User Datagram Protocol). At step 3-a, the client sends a SYN packet to the proxy to initiate an active open. At step 3-b, the proxy replies to the client with a SYN/ACK packet, on behalf of the server. At step 3-c, the client sends an ACK packet back to the proxy. As shown in steps 3-a to 3-c, the transparent SSL proxy in the relay may terminate this TCP connection So the network latency for TCP setup (steps 3-a to 3-c) in this example is 3x ms.

Then SSL full handshake starts. At step 4, the client sends an SSL ClientHello message to the relay. The step 4 starts immediately after step 3-c, so that no extra latency is incurred. At step 5, the SSL proxy selects some non-confidential SSL parameters based on information obtained in step 2, over the pre-established TCP connection to the SSL Server. Then at step 6, the proxy generates and returns SSL ServerHello, Certificate, and ServerHelloDone messages to the SSL client on behalf of the SSL server. This may be done without possession of the SSL server's private key, assuming a cipher requiring SSL Server Key Exchange message is not used in full handshake. Step 5 is operated in memory of the proxy and does not incur noticeable latency. Therefore, steps 4 to 6 take x ms in total.

Upon receiving the SSL handshake messages from step 6, the SSL client may generate a pre-master secret and derive a master secret and session keys. Then at step 7, the client sends SSL ClientKeyExchange, ChangeCipherSpec and Finished messages to the proxy. The proxy may then attach on the messages the SSL parameters selected for this SSL session in step 5 and send them all over to the server in step 8. Steps 7 and 8 take (x+y) ms in total.

Upon receiving the SSL handshake messages from step 8, the SSL server may verify the SSL parameters as legitimate at step 9-a, generate virtual SSL ServerHello, Certificate and ServerHelloDone messages based on the legitimate SSL parameters at step 9-b, and retrieve the pre-master secret and generate the master secret and the SSL session keys at step 9-c, Steps 9-a to 9-c are operated in memory of the server and is negligible for network latency incurred in this example.

Then at step 10, the SSL server returns TLS/SL ChangeCipherSpec and Finished messages to the SSL proxy And the proxy then forwards them to the SSL client at step 11. The client may verify the SSL Finished message received in step 11. If verification is successful, the SSL session is established. Otherwise, the SSL client may drop the SSL session. Steps 9 to 11 take (x+y) ms in total. Note that in step 9-a, if the SSL parameters are not legitimate and appropriate, the SSL server may just return an SSL error alert to the SSL proxy in step 10. Then the SSL proxy may forward that to the SSL client in step 11 to abort the SSL handshake.

Altogether, the full TCP+SSL handshake takes (6x+2y) ms with the help of the transparent SSL proxy closer to the client. In comparison as shown in FIG. 1, the entire TCP+SSL full handshake in prior art takes 6(x+y) ms network latency. This is because in FIG. 1, the one-way latency between the client and the server is (x+y) ms and each round trip time (RTT) takes 2(x+y) ms network latency Hence, the example shown in FIG. 9 saves 4y ms in network latency for the entire TCP+SSL full handshake compared to the prior art in FIG. 1. In other words, this example only incurs one round trip via the long haul network. Since the long haul latency round trip latency time (RTT) may easily reach 100 ms to 200 ms, a significant 200 to 400 ms may be saved for each full TCP+SSL handshake. Because tens of HTTPS URLs may be embedded in a secure web page, the embodiment illustrated in FIG. 9 may reduce network latency even more significantly since tens of TCP+SSL full handshakes are needed.

Note that the latency improvement on SSL full handshake and abbreviated handshake applies when SSL is over other connection-oriented protocols besides TCP. Furthermore, the latency improvement on SSL full handshake applies even when SSL is over connection-less protocols, such as User Datagram Protocol (UDP). For example, the latency of full handshake in TLS over UDP, called DTLS (Datagram Transport Layer Security), can be improved as such. The first and second connections can be viewed as "virtual connection" when they are based on connection-less protocols. Also, the first and second connections do not have to be based on the same protocol, e.g., one may be based on TCP and the other may be based on UDP Moreover, the method and system disclosed herein do not compromise security, since it is still end-to-end security from the user/client all the way to the origin server. The transparent SSL proxy in the relay does not terminate the SSL connection from the client to the origin server. Hence the proxy does not need or have the SSL private key. Also, the cipher suite preference list and possible compression support of the origin servers can be easily probed. In addition, since session ID in itself is just an identifier of an SSL session for both the client and the server, it is not a security risk to share the session ID with the SSL proxy, without sharing the session data.

Furthermore, the method and system disclosed herein require minimum operational efforts. The proxy mapping configurations at the SSL proxy is relatively stable and less likely to change, since the serving infrastructure and its domain/IP assignment rarely change. The SSL server configurations, SSL version, compression, cipher string are less likely to change and could be the same across all SSL servers in service. The SSL proxy may self-learn the certificates of the SSL origin server without configuration or update. Also, there is no need for a change of the client SSL stack. It is still standard SSL protocol between the SSL client and the SSL proxy, hence the word "transparent" is used to describe this SSL proxy. The method and system disclosed herein works for abbreviated SSL handshake as well.

To implement the present disclosure, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to reduce network latency essentially as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 11:
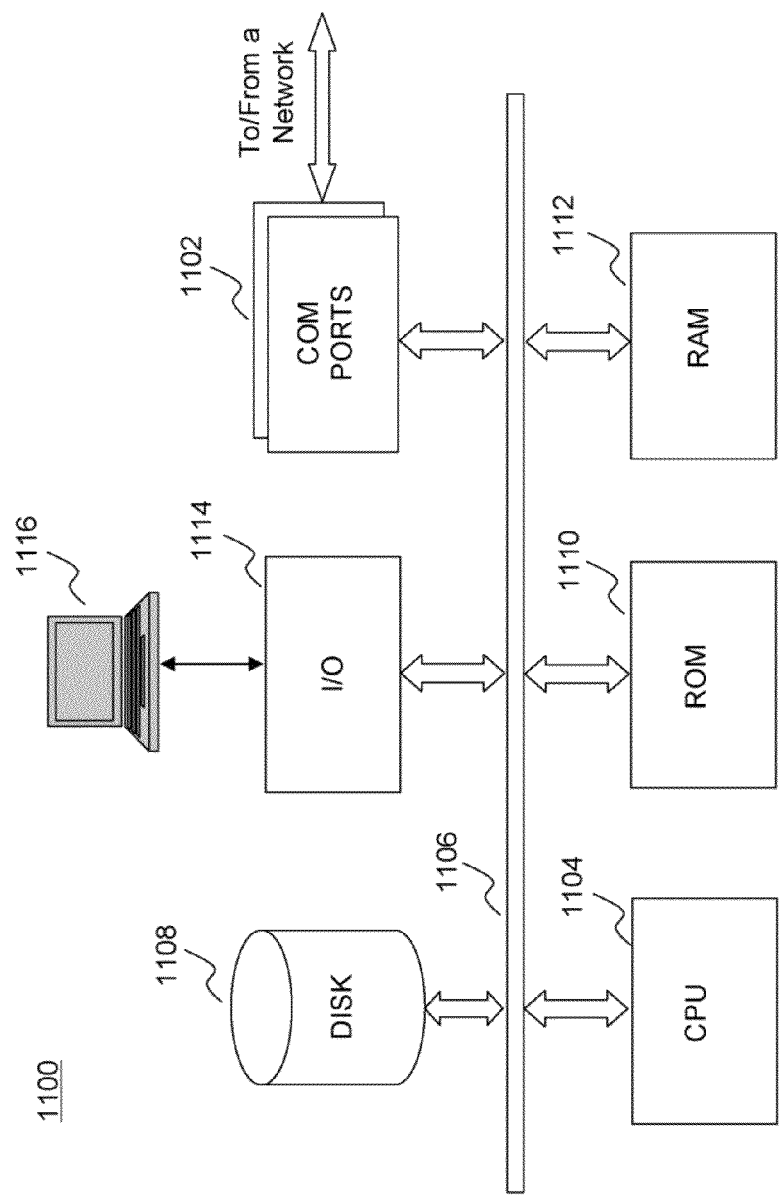
FIG. 11 depicts a general computer architecture on which the present disclosure can be implemented.

FIG. 11 depicts a general computer architecture on which the present disclosure can be implemented and has a functional block diagram illustration of a computer hardware platform that includes user interface elements. The computer may be a general-purpose computer or a special purpose computer. This computer 1100 can be used to implement any components of the communication system as described herein. Different components of the system 200, e.g., as depicted in FIG. 2, can all be implemented on one or More computers such as computer 1100, via its hardware, software program, firmware, or a combination thereof. Although only one such computer is shown, for convenience, the computer functions relating to connection establishment and communication may be implemented in a distributed fashion on a number of similar platforms, to distribute the processing load.

The computer 1100, for example, includes COM ports 1102 connected to and from a network connected thereto to facilitate data communications. The computer 1100 also includes a central processing unit (CPU) 1104, in the form of one or more processors, for executing program instructions. The exemplary computer platform includes an internal communication bus 1106, program storage and data storage of different forms, e.g., disk 1108, read only memory (ROM) 1110, or random access memory (RAM) 1112, for various data files to be processed and/or communicated by the computer, as well as possibly program instructions to be executed by the CPU. The computer 1100 also includes an I/O component 1114, supporting input/output flows between the computer and other components therein such as user interface elements 1116. The computer 1100 may also receive programming and data via network communications.

Hence, aspects of the method of reducing network latency, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to an medium that participates in providing instructions to a processor for execution.

Hence, a machine readable medium may take many forms, including but not limited to, a tangible storage medium, a carrier wave medium or physical transmission medium Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables: copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present disclosures are amenable to a variety of modifications and/or enhancements. For example, although the implementation of various components described above may be embodied in a hardware device, it can also be implemented as a software only solution—e.g., an installation on an existing server. In addition, the units of the host and the client, nodes as disclosed herein can be implemented as a firmware, firmware/software combination, firm ware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the disclosures may be applied in numerous applications, only some of which have been described herein it is intended by the following claims to claim any and all applications, modifications and variations that fall within the true scope of the present disclosures.

I claim:

1. A method, implemented on at least one machine having at least one processor, storage, and a communication platform connected to a network for reducing network latency, comprising the steps of:
   establishing a first connection between a relay and a host in the network;

receiving, by the relay over the first connection, non-confidential information from the host, wherein the non-confidential information comprises non-confidential parameters;

storing the non-confidential information at the relay;

establishing a second connection between the relay and a node in the network;

receiving, by the relay, a first non-confidential message directed to the host from the node;

selecting, by the relay, one or more parameters from the non-confidential parameters received over the first connection;

generating, by the relay, a second non-confidential message based on the selected one or more parameters;

transmitting, by the relay, the second non-confidential message to the node on behalf of the host; and forwarding, by the relay over the first and second connections, confidential information between the node and the host.

2. The method of claim 1, wherein the step of forwarding confidential information between the node and the host comprises:

receiving a first confidential message directed to the host from the node;

selecting parameters for the first confidential message based on the non-confidential information received over the first connection;

transmitting the first confidential message and the selected parameters to the host;

receiving a second confidential message from the host; and transmitting the second confidential message to the node.

3. The method of claim 2, wherein the first and second confidential messages comprise handshake messages based on TLS/SSL, and wherein the step of forwarding confidential information between the node and the host further comprises:

routing to the host based on a configuration file or TLS/SSL Server Name Indication (SNI) extension or any other extension that can assist routing.

4. The method of claim 1, wherein the first connection is based on connection-oriented protocols, e.g. Transmission Control Protocol (TCP), or connection-less protocols, e.g. User Datagram Protocol (UDP), and wherein the non-confidential information received over the first connection includes parameters from a list of cipher suite preference, a list of random numbers, or a list of session identifications (IDs).

5. The method of claim 1, wherein the first and second non-confidential messages comprise handshake messages based on TLS/SSL.

6. The method of claim 1, wherein each machine of the at least one machine is connected via a network with higher latency to the host and is connected via a network with lower latency to the node.

7. A system for reducing network latency in a network, comprising:

at least one processor, storage, and a communication platform connected to the network;

a connection establishing unit in a relay in the network configured to:

establish a first connection between the relay and a host in the network, and establish a second connection between the relay and a node in the network;

a listening unit in the relay configured to receive, over the first connection, non-confidential information from the host and store the non-confidential information at the relay, wherein the non-confidential information comprises non-confidential parameters;

a communication unit in the relay, wherein the communication unit comprises:

a listening unit configured to receive a first non-confidential message directed to the host from the node, and a working unit configured to:

select one or more parameters from the non-confidential parameters received over the first connection, generate a second non-confidential message based on the selected one or more parameters, and transmit the second non-confidential message to the node on behalf of the host; and a transmitting unit in the relay configured to forward, over the first and second connections, confidential information between the node and the host.

8. The system of claim 7, wherein the communication unit comprises:

a listening unit configured to:

receive a first confidential message directed to the host from the node, and receive a second confidential message from the host;

a working unit configured to select parameters for the first confidential message based on the non-confidential information received over the first connection; and a transmitting unit configured to:

transmit the first confidential message and the selected parameters to the host, and transmit the second confidential message to the node.

9. The system of claim 8, further comprises:

a configuration unit configured to route to the host based on a configuration and a routing unit configured to route to the host based on TLS/SSL Server Name Indication (SNI) extension or any other extension that can assist routing, wherein the first and second confidential messages comprise handshake messages based on TLS/SSL.

10. The system of claim 7, wherein the first connection is based on connection-oriented protocols, e.g. Transmission Control Protocol (TCP), or connection-less protocols, e.g. User Datagram Protocol (UDP), and wherein the non-confidential information received over the first connection includes parameters from a list of cipher suite preference, a list of random numbers, or a list of session identifications (IDs).

11. The system of claim 7, wherein the first and second non-confidential messages comprise handshake messages based on TLS/SSL.

12. The system of claim 7, wherein the relay is connected via a network with higher latency to the host and is connected via a network with lower latency to the node.

13. A machine-readable tangible and non-transitory medium having information for reducing network latency in a network, wherein the information, when read by the machine, causes the machine to perform the following steps:

establishing a first connection between a relay and a host in the network;

receiving, by the relay over the first connection, non-confidential information from the host, wherein the non-confidential information comprises non-confidential parameters;

storing the non-confidential information at the relay;

establishing a second connection between the relay and a node in the network;

receiving, by the relay, a first non-confidential message directed to the host from the node;

selecting, by the relay, one or more parameters from the non-confidential parameters received over the first connection;

generating, by the relay, a second non-confidential message based on the selected one or more parameters;

transmitting, by the relay, the second non-confidential message to the node on behalf of the host; and forwarding, by the relay over the first and second connections, confidential information between the node and the host.

14. The medium of claim 13, wherein the step of forwarding confidential information between the node and the host comprises:

receiving a first confidential message directed to the host from the node;

selecting parameters for the first confidential message based on the non-confidential information received from the host over the first connection;

transmitting the first confidential message and the selected parameters to the host;

receiving a second confidential message from the host; and transmitting the second confidential message to the node.

15. The medium of claim 13, wherein each machine of the at least one machine is connected via a network with higher latency to the host and is connected via a network with lower latency to the node.

16. The medium of claim 13, wherein the first connection is based on connection-oriented protocols, e.g. Transmission Control Protocol (TCP), or connection-less protocols, e.g. User Datagram Protocol (UDP), and wherein the non-confidential information received over the first connection includes parameters from a list of cipher suite preference, a list of random numbers, or a list of session identifications (IDs).

17. The medium of claim 13, wherein the first and second non-confidential messages comprise handshake messages based on TLS/SSL.

18. The medium of claim 14, wherein the first and second confidential messages comprise handshake messages based on TLS/SSL, and wherein the step of forwarding confidential information between the node and the host further comprises:

routing to the host based on a configuration file or TLS/SSL Server Name Indication (SNI) or any other extension that can assist routing.

19. A method, implemented on at least one machine having at least one processor, storage, and a communication platform connected to a network for reducing network latency, comprising the steps of:

establishing a first connection between a relay and a host in the network;

transmitting, by the host over the first connection, non-confidential information to the relay, wherein the relay
stores the non-confidential information at the relay, wherein the non-confidential information comprises non-confidential parameters,
receives a first non-confidential message directed to the host from a node in the network,
selects one or more parameters from the non-confidential parameters received over the first connection,
generates a second non-confidential message based on the selected one or more parameters, and
transmits the second non-confidential message to the node on behalf of the host; and communicating, by the host via the relay, confidential information with the node, wherein the relay forwards, over the first and second connections, confidential information between the node and the host.

20. A system for reducing network latency in a network, comprising:

at least one processor, storage, and a communication platform connected to the network;

a connection establishing unit in a host in the network configured to establish a first connection between a relay in the network and the host;

a transmitting unit in the host configured to transmit, over the first connection, non-confidential information to the relay, wherein the relay
stores the non-confidential information at the relay, wherein the non-confidential information comprises non-confidential parameters,
receives a first non-confidential message directed to the host from a node in the network,
selects one or more parameters from the non-confidential parameters received over the first connection,
generates a second non-confidential message based on the selected one or more parameters, and
transmits the second non-confidential message to the node on behalf of the host; and a communication unit in the host configured to communicate, via the relay, confidential information with the node, wherein the relay forwards, over the first and second connections, confidential information between the node and the host.

21. A machine-readable tangible and non-transitory medium having information for reducing network latency in a network, wherein the information, when read by the machine, causes the machine to perform the following steps:

establishing a first connection between a relay and a host in the network;

transmitting, by the host over the first connection, non-confidential information to the relay, wherein the relay
stores the non-confidential information at the relay, wherein the non-confidential information comprises non-confidential parameters,
receives a first non-confidential message directed to the host from a node in the network,
selects one or more parameters from the non-confidential parameters received over the first connection,
generates a second non-confidential message based on the selected one or more parameters, and
transmits the second non-confidential message to the node on behalf of the host; and communicating, by the host via the relay, confidential information with the node, wherein the relay forwards, over the first and second connections, confidential information between the node and the host.

* * * * *